US006411470B1

(12) United States Patent
Hamilton et al.

(10) Patent No.: US 6,411,470 B1
(45) Date of Patent: Jun. 25, 2002

(54) DURABLE, LOW-VIBRATION, DYNAMIC-CONTACT HARD DISK DRIVE SYSTEM

(75) Inventors: Harold J. Hamilton, Santa Clara; Timothy W. Martin, Los Altos, both of CA (US)

(73) Assignee: Censtor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/621,521

(22) Filed: Mar. 25, 1996

Related U.S. Application Data

(63) Continuation-in-part of application No. 08/528,890, filed on Sep. 15, 1995, which is a continuation-in-part of application No. 08/515,140, filed on Aug. 15, 1995, and a continuation-in-part of application No. 08/338,394, filed on Nov. 14, 1994, which is a continuation-in-part of application No. 08/191,967, filed on Feb. 4, 1994, now abandoned, which is a continuation-in-part of application No. 07/919,302, filed on Jul. 23, 1992, now abandoned, which is a continuation-in-part of application No. 07/806,611, filed on Dec. 12, 1991, now Pat. No. 5,174,012, said application No. 08/338,394, is a continuation-in-part of application No. 07/966,095, filed on Oct. 22, 1992, which is a continuation-in-part of application No. 07/783,509, filed on Oct. 28, 1991.

(51) Int. Cl.$^7$ .............................................. G11B 5/187
(52) U.S. Cl. ................... 360/246.1; 360/246.2; 360/246.3; 360/246.4; 360/246.5
(58) Field of Search .......................................... 360/104

(56) References Cited

U.S. PATENT DOCUMENTS

| 4,620,251 A | | 10/1986 | Gitzendanner ............... 360/103 |
|---|---|---|---|
| 4,819,091 A | | 4/1989 | Brezoczky et al. ...... 360/97.01 |
| 4,901,185 A | | 2/1990 | Kubo et al. .................. 360/104 |
| 5,041,932 A | * | 8/1991 | Hamilton ..................... 360/104 |
| 5,065,271 A | * | 11/1991 | Matsuura et al. ........... 360/104 |
| 5,198,934 A | | 3/1993 | Kubo et al. .................. 360/104 |
| 5,490,027 A | * | 2/1996 | Hamilton et al. ........... 360/104 |
| 5,557,488 A | * | 9/1996 | Hamilton et al. ........... 360/104 |
| 5,561,570 A | * | 10/1996 | Gill et al. .................... 360/104 |

* cited by examiner

*Primary Examiner*—Robert S. Tupper
(74) *Attorney, Agent, or Firm*—Mark Lauer

(57) ABSTRACT

A disk drive system for contact recording has a flexure beam holding a transducer at one end, the flexure beam being oriented substantially along the direction that the transducer slides on a rigid magnetic disk. The transducer has a protrusion which contacts the disk and separates the rest of the transducer from the moving air film that adjoins the spinning disk, the protrusion containing a magnetic pole structure that communicates with the disk during sliding. A preferred embodiment employs a gimbal structure which allows limited movement of the transducer relative to the flexure beam and three disk-contacting pads extending down from the transducer to make contact with the magnetic disk, at least one of the pads containing a magnetic pole structure and two of the pads trailing the third pad.

6 Claims, 7 Drawing Sheets

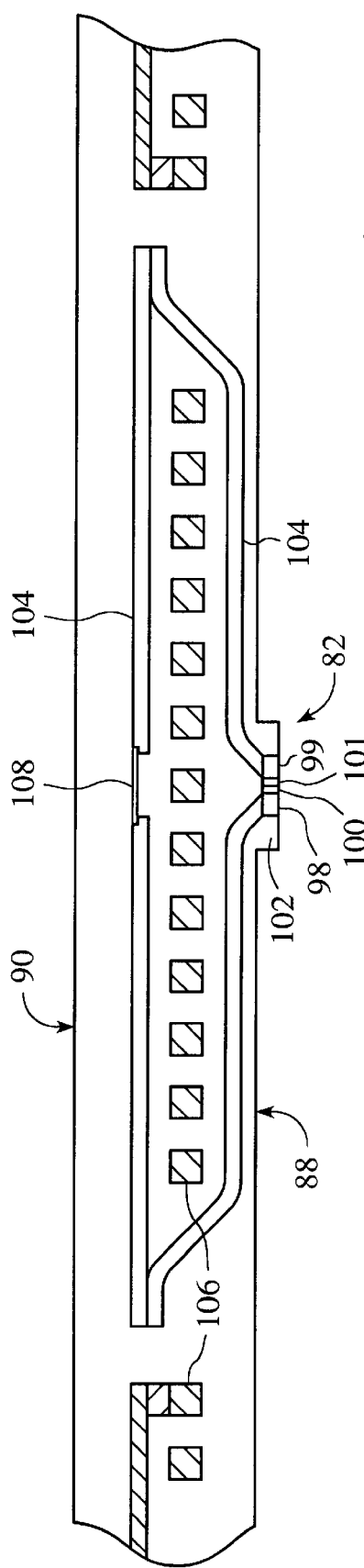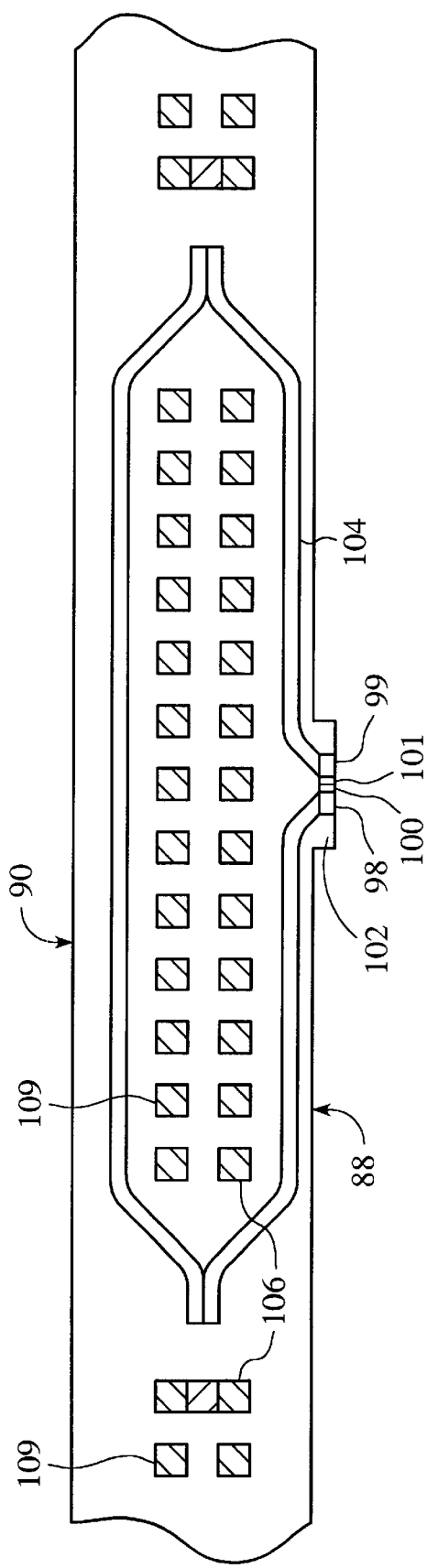

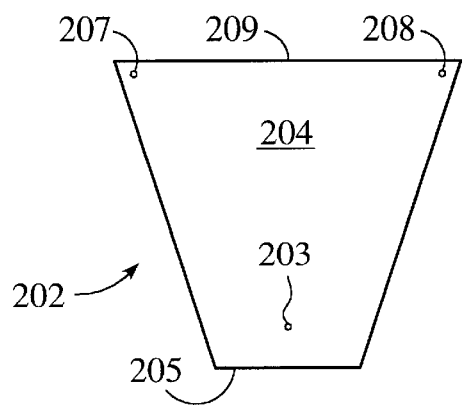
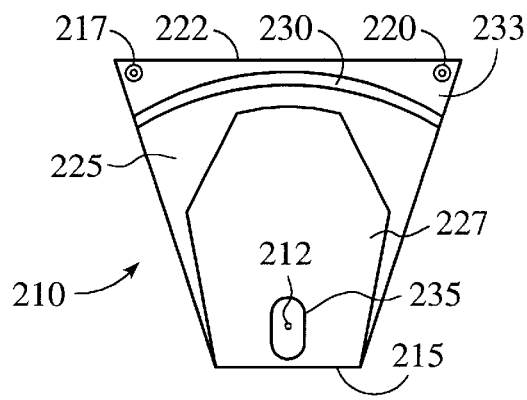
FIG. 11A    FIG. 11B
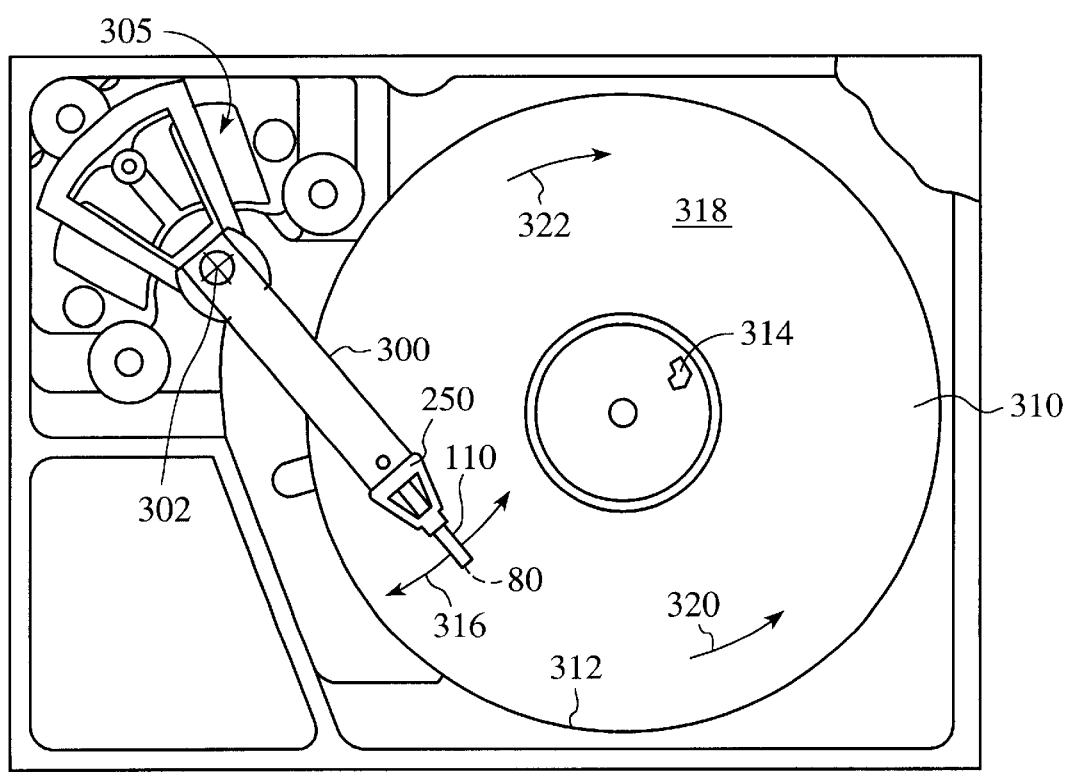
FIG. 13

DURABLE, LOW-VIBRATION, DYNAMIC-CONTACT HARD DISK DRIVE SYSTEM

CROSS REFERENCE TO RELATED APPLICATIONS

This is a continuation-in-part of pending U.S. patent application Ser. No. 08/528,890, filed Sep. 15, 1995, which is a continuation-in-part of pending U.S. patent application Ser. No. 08/515,140, filed Aug. 15, 1995 and pending U.S. patent application Ser. No. 08/338,394, filed Nov. 14, 1994, which is a continuation-in-part of abandoned U.S. patent application Ser. No. 08/191,967, filed Feb. 4, 1994, which is a continuation-in-part of abandoned U.S. patent application Ser. No. 07/919,302, tiled Jul. 23, 1992, which is a continuation-in-part of U.S. Pat. No. 5,174,012 Dec. 12, 1991 and U.S. Ser. No. 07/441716 issued Dec. 29, 1997, which is a continuation-in-part of U.S. Ser. No. 07/806611 now U.S. Pat. No. 5,041,932, filed Nov. 27, 1989 and issued Aug. 20, 1991. Above-listed U.S. patent application Ser. No. 08/338,394 is also a continuation-in-part of U.S. Pat. No. 5,550,691, filed Oct. 22, 1992 as Ser. No. 07/966,095, which is a continuation-in-part of abandoned U.S. patent application Ser. No. 07/783,509, filed Oct. 28, 1991.

FIELD OF THE INVENTION

This invention relates to disk drives that store and retrieve information on a spinning, rigid magnetic recording disk.

BACKGROUND OF THE INVENTION

Conventional hard disk drive systems spin at least one disk containing a thin magnetic media layer or layers in which a head of the system stores data for later retrieval. The head includes an inductive transducer which converts electrical signals from read/write electronics, usually associated with a computer, to magnetic fields which in turn create magnetic patterns in the media during information storage. During reading the transducer converts those magnetic patterns to electrical signals. Alternatively, the written signals may be read with a magnetoresistive sensor included in the head, which senses a change in current or voltage due to the effect of the magnetic patterns on the resistance of the sensor.

The head also includes an aerodynamic slider which is designed to interact with an air layer that accompanies the moving disk to cause a slight separation of the disk and the head, the essentially stationary head "flying" over the spinning disk. Though this separation serves the purpose of avoiding wear of the head and the disk, it also reduces resolution of signal communication between the transducer and the media. To increase data storage density, the air separation between the transducer and the media has generally decreased over many years of development in the magnetic storage industry. However, a smaller separation generally increases the probability of impact between the head and the disk during operation of the disk drive system, often resulting in destruction of the disk drive and loss of stored information. Perhaps the most destructive type of impact can occur due to dynamic instabilities of the head, which cause a corner of the head to impact the disk, focusing the energy transfer of the impact in the relatively small region of contact between the corner and the disk.

Instead of completely separating from the disk, U.S. Pat. No. 4,901,185, to Kubo et al. discloses a slider designed to operate with a leading edge lifted by the air layer that accompanies the spinning disk while a trailing edge contacts the disk, the slider holding a magnetic read/write transducer that is designed for vertically magnetized recording. To avoid destructive wear and to minimize variations in the head-disk separation the head is mounted on the trailing edge of the tail dragging slider so that a constant separation between the head and the disk is maintained.

In U.S. Pat. No. 4,819,091, Brezoczky et al. propose a magnetic recording head comprised of a slider composed of a single crystal material, onto which a magnetic read/write transducer is appended. During operation of the disk drive system the rubbing between the disk and the slider produces an electrical attractive force maintaining contact between the slider and the disk. To avoid destructive wear of the head it is important that the slider be so much more thermally conductive than the much larger disk that the slider is maintained at a lower temperature than the disk during operation of the system. It is also important for the Brezoczky invention to maintain an orientation of the slider relative to the spinning disk that avoids flying and other problems.

An object of the present invention was to provide a hard disk drive recording system which affords substantially continuous operational contact between the head and disk without damaging the head or the disk. More specific objects included the intuitively contradictory goals of minimizing dynamic instabilities of the transducer that would otherwise cause damage or interfere with the reading and writing of data, providing flexibility for transducer conformance to the rapidly spinning, rigid disk surface and providing rapid accessibility of the transducer to various points on the disk surface for data storage and retrieval.

SUMMARY OF THE INVENTION

The above objects have been achieved in a hard disk drive system employing an elongated flexible beam to hold a transducer in sliding contact with a hard magnetic disk during writing and reading, the flexure beam extending lengthwise over the disk substantially along the direction that the transducer slides on the disk. This orientation aligns the most rigid dimension of the beam with the direction of relative motion during contact between the disk and the transducer, thereby reducing deleterious vibrations that may otherwise be induced by friction between the disk and transducer. Due to the alignment between the rapidly spinning disk and the direction of the beam most resistant to mechanical forces, the flexure and transducer can be made smaller and lighter.

The flexure size reduction affords increased flexibility in a direction normal to the disk surface, while the weight reduction provides lower inertial resistance to disk surface variations, both of which help to decrease wear and avoid catastrophic impacts between the head and the disk. The decreased mass and increased flexibility also allow for a reduction in the load applied to hold the transducer to the disk, which along with the decreased mass and increased flexibility affords a reduction in area of contact between the transducer and the disk without a destructive increase in pressure therebetween, while a smaller area of contact reduces the aerodynamic lift of the transducer from the disk, affording a further reduction in applied load. The small transducer contact area also minimizes frictional forces that cause vibrations and power loss, the reduction of friction also allowing a skew to occur between the flexure axis and the motion of the disk at the contact area without inducing excessive lateral vibrations. A magnetic poletip or pair of magnetic poletips separated by an amagnetic gap borders the disk in the contact area of the transducer, reducing spacing between the transducer and the information storage medium of the disk.

The disk can be rotated with the flexure beam oriented along the direction of sliding in either a forward or a reverse mode. In the forward mode a localized portion of the disk contacting the transducer moves generally from an end of the beam adjacent to the actuator to an end of the beam adjacent to the transducer, while in the reverse mode such a portion of the disk moves generally from the transducer end to the mounting end of the beam. One difference between spinning the disk in these two modes is the amount of vertical force between the transducer and the disk due to the friction between the transducer and the disk, as translated by the moment arm of the flexure beam. Spinning the disk in the reverse mode generally creates additional loading between the transducer and the disk, as the beam is usually mounted in a plane outside the disk surfaces, allowing a lower static load to be applied to the beam, although this force is minimized by the extremely low beam angle and flexibility. The ability to operate in either the forward or reverse mode has an added benefit during start up of the system, when bi-directional motion may be employed during motor seeking and for loosening the slider from the disk, an operation which commonly causes conventional aerodynamic sliders, which are not designed for sliding in either direction, to dig into the disk.

In a preferred embodiment a gimbal is interposed between the slider and the flexure beam, providing the slider with additional flexibility to react to disk surface anomalies by pitching and rolling. This improved conformance between the disk and the slider decreases wear to the head and the disk in addition to increasing the tendency of the transducer to remain in contact with the disk. A microscopic slider having three hard disk-contacting projections or pads, at least one of which contains a pole structure of the transducer, is attached to the gimbal. Having a pole structure encased in a disk-contacting pad offers a durable reduction in spacing between the pole structure and the media, while the pads hold the body of the slider sufficiently away from disk to avoid air bearing effects caused by the thin air layer that travels with the disk. The gimbaled, three pad structure can maintain stable contact with the rapidly spinning disk despite disk surface anomalies or differences in pad height.

Design of the suspension beam and gimbal for reduced vibration has been realized to be essential to the operation of the system, as the forcing function from friction between the contact slider and the disk is larger than the drag typically encountered by a flying slider of the prior art, while the mass is less. In particular, the suspension must avoid geometries in which resonant frequencies may be positively coupled to changing frictional forces. Moreover, resonant modes of vibration, which theoretically comprise an infinite series, including lateral, longitudinal, and torsional modes which may intercouple, must not interact with a forcing function such as friction so that a negative effective spring constant occurs, or positive feedback can result in a untenable vibration. Due to other beam requirements, such as providing low-capacitance conductive leads and an effective mass and vertical load force several times less that of conventional sliders, discovery of these rules of low-vibration contact slider suspension design does not lead to trivial solutions.

In minimizing vibration of the three pad, gimbal combination, it has been found to be important to have the resultant force from friction directed away from, rather than toward, any gimbal pivot axis about which that force acts as a torque. Since the gimbal preferably has such a pivot axis located between the leading and trailing pads, this suggests that the friction force on the leading pad or pads should be less than that on the trailing pad or pads. With the disk spinning in the forward mode and all three pads sliding on the disk, it is thus preferable for reduced vibration to have one leading pad and two trailing pads, such that the two trailing pads are located furthest from the mounting end of the beam. To increase transducer accessibility to the outer tracks of the disk surface in this case, the magnetically active pole structure may be located in the outside trailing pad. For this, both of the trailing pads may be formed with magnetically active pole structures and associated transducers, which are then tested before beam attachment to determine which pad has the better transducer in order to sort the chips for operation on either up or down sides of the disk. On the other hand, for forward mode spinning with a single magnetically active trailing pad and a pair of leading pads, it is important that the leading pads have reduced friction, which may be accomplished in those pads due to reduced relative size, lower load, employment of low-friction leading pad materials, at least partial levitation of the leading pads or some combination of these techniques. The goal of having a resultant frictional force that trails the gimbal pivot axis is realized in the reverse spinning mode by essentially reversing the orientation of the contact pads compared to that of the forward mode, so that a single leading and a pair of trailing pads again results.

An adapter may be provided which fits the beam to a compact, lightweight rotary actuator for accessing various tracks of the disk. The adapter offers a preselected angular shift from the bearing of the actuator arm, which pivots in a plane generally parallel to the disk surface, to that of the flexure beam, which approaches the disk surface at an oblique angle. The angle at which the flexure beam approaches the disk is chosen so that the beam is bowed slightly, providing a force or load holding the transducer to the disk without the stress and inaccuracy that result from forming an angle in the beam. The adapter contains a shock absorbing structure extending adjacent to the flexure beam on an opposite side from the disk, so that shocks which propel the transducer from the disk surface are transferred to the adapter rather than retained by the beam, allowing the transducer to return to the disk surface with greatly reduced force. The beam is designed to provide a similar shock absorption function by overlapping the chip, so that shocks which lift a pad or pads of the gimbaled chip are limited by the chip impacting the beam, which absorbs energy from the chip and thereby mitigates damage upon recontact of the pad or pads with the disk. This close separation of the chip and the beam also protects the thin gimbal members from overstress.

In either the gimbaled or non-gimbaled embodiment, the head is designed to avoid flying, a dramatic departure from conventional design, the lack of airlift allowing a lower loading force to be applied to maintain contact between the head and disk. The lower load also allows the head and flexure to be lighter and more flexible, which further reduces wear and impact problems. In sum, the flexure beam orientation and non-flying head allow the employment of the lightweight head and flexure combination, which in turn affords long-term, non-catastrophic, virtually continuously sliding operation.

BRIEF DESCRIPTION OF THE DRAWINGS

FIG. 6 is a cross-sectional view of an inductive writing and magnetorestive sensing transducer associated with one of the disk-contacting pads of FIG. 4.

FIG. 7 is a cross-sectional view of an inductive writing and sensing transducer associated with one of the disk-contacting pads of FIG. 4.

FIG. 11A is a bottom view of a slider having a single leading magnetically active contact pad.

FIG. 11B is a bottom view of a slider having a single trailing magnetically active contact pad.

FIG. 13 is an opened up top view of a disk drive system employing the flexure beam and adapter of FIG. 12.

DESCRIPTION OF THE PREFERRED EMBODIMENT

Figure 1:
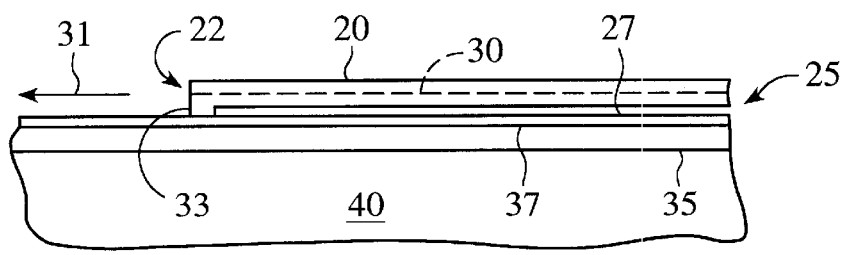
FIG. 1 is a simplified side view of a flexure beam of the present invention holding a transducer sliding on a rigid storage disk along a direction of disk travel.
Figure 4:
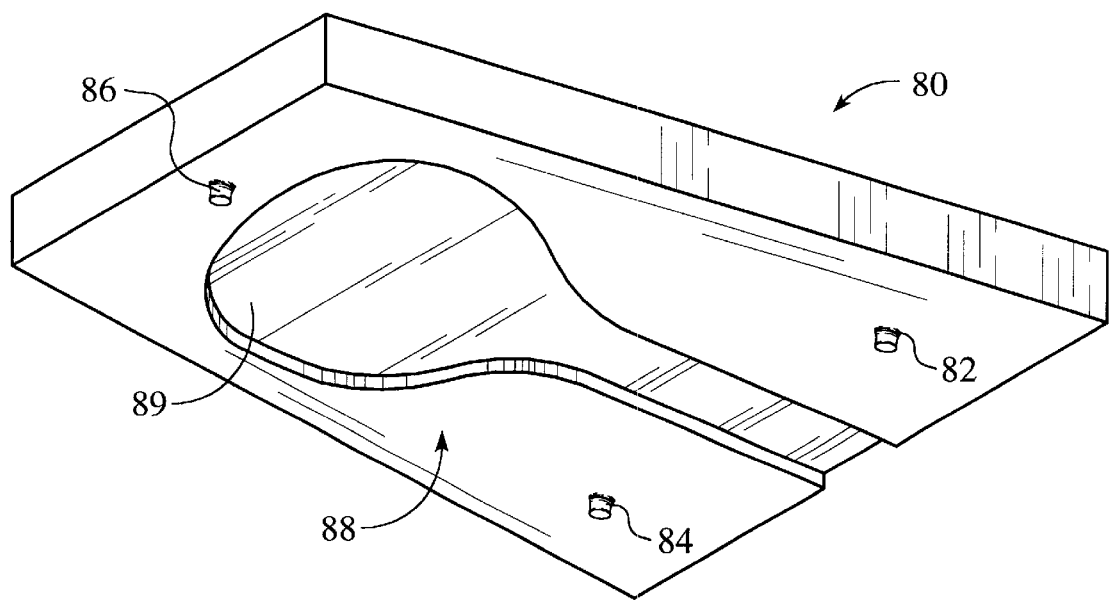
FIG. 4 is a perspective view of a disk-facing side of a slider of the present invention including a trio of disk-contacting pads, two of which contain reading and writing structures.
Figure 5:
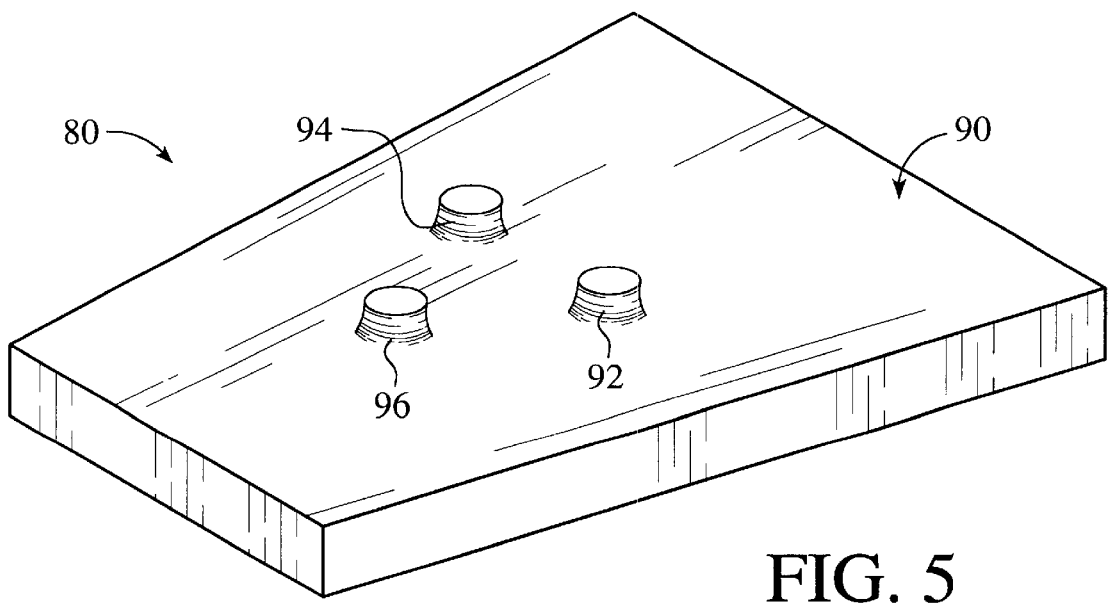
FIG. 5 is a perspective view of an opposite side of the slider of FIG. 4 including a trio of support posts, two of which also serve as conductive leads.

In FIG. 1, an elongated flexure beam 20 holding a transducer 22 at one end is shown sliding on a magnetic recording disk 25 during information storage and/or retrieval (see also FIGS. 4 and 5 of parent U.S. Pat. No. 5,041,932). The flexure beam 20 has a longitudinal axis 30 which is oriented generally along a direction 31 of localized disk 25 motion at the point of contact between the transducer and a magnetic recording surface 27 of the disk. This orientation of the flexure beam 20 aligns the frictional force felt by the transducer 22 with the most rigid direction of the beam, minimizing friction induced vibration in the transducer and beam. The transducer 22 has a small projection 33 for sliding on the disk surface 27, the projection containing a pair of magnetic poletips separated by an amagnetic gap. The beam 20 is bowed slightly to provide a force holding the transducer 22 to the surface 27, the bowing so slight as to be difficult to depict in this figure.

In a forward mode of operation, the magnetic recording surface 27 moves relative to the transducer 22 along the direction 31 during writing and reading of magnetic patterns or bits in a media layer 35 of the disk 25, the media layer being separated from the projection 33 by a hard overcoat layer 37. Alternatively, in a reverse mode of operation, the transducer 22 and flexure 20 move in the direction 31 relative to the recording surface. The media layer 35 may be singular or may include multiple layers of magnetic materials, the layer or layers being designed to have an easy axis of magnetization in a direction either generally parallel or generally perpendicular to the surface 27, and a magnetically permeable underlayer may also be provided, all of which are shown simply as a single layer 35 for clarity. A self supporting substrate 40 which may be made of a dielectric such as glass, a metal or alloy such as aluminum, or other materials is shown adjoining the media layer 35 opposite to the surface 27, although other disk elements such as seed layers and texture layers may optionally be disposed between the media layer and the substrate, such elements not being shown in this figure in order to facilitate illustration.

Directing such an elongated flexible beam 20 along the localized motion of the disk surface 27 minimizes deleterious low frequency and lateral vibrations in the beam, while providing needed flexibility to conform to variations of the rigid disk 25 or overcoat 37 in a direction normal to the disk surface. Furthering the ability to conform to the rigid disk surface 27 is the small mass of the transducer, which is preferably less than about 10 milligrams, and the low mass of the beam 20 as felt by the disk surface, which preferably adds less than 10 milligrams to the inertia felt by the disk surface. The employment of a low mass transducer 22 and a beam 20 having increased flexibility normal to the disk surface 27 affords a reduction in the disk contacting area of the projection without risking a catastrophic increase in pressure between the transducer and the disk during a shock to the drive, the reduced contact area reducing friction and allowing a small skew in the direction of sliding relative to the beam. Preferably the area of contact of the projection 33 facing the disk is at least somewhat equilateral or circular and totals less than 10,000 $\mu m^2$. The flexure beam 20 in this embodiment includes two embedded conductors which extend longitudinally to connect with a coil of the transducer 22. The transducer 22 includes a magnetic core coupled to the coil and terminating in a pair of poletips that slide on the disk surface, writing and reading data in the media layer 35 in either a perpendicular or longitudinal mode.

In order to see how the present invention reduces vibration over prior art systems, it may be useful to look briefly at the causes and consequences of vibration in a disk drive system. In general, a simple beam will vibrate at a resonant frequency that is generally a function of its spring constant, i.e., $f_R \cong \sqrt{(k/m)}$, where $f_R$ is the resonant frequency of the beam, k is its spring constant, and m is its mass. Vibration is generally induced due to a changing force acting on the beam, some of that force being transferred into motion of the beam. In the absence of a time dependent force acting on the beam, vibration will generally decline over time, as the energy of vibration is absorbed by internal damping and lost to heat or other forms of energy. The most significant vibration occurs for the situation in which the force acting on the beam has a time dependence matching the resonance frequency $f_R$, and in particular for the case where the resonance vibration causes an increase in that periodic force, i.e., a feedback situation. Low frequency vibrations are generally more harmful in a disk drive system as they generally result in greater displacement of the transducer, which can cause tracking and bit shift errors, although electronic compensations such as phase locked loops and automatic gain controls can reduce such errors.

For a beam formed from an homogenous material and fixed at one end, the spring constant k, as well as the vibrational frequency, depends on the direction of motion or mode of vibration as well as the dimensions of the beam. In a longitudinal mode of vibration, that is, a vibration that reciprocates toward and away from the fixed end, the spring constant is generally proportional to the width of the beam multiplied by the thickness of the beam and divided by the length of the beam, i.e., $k_{long} \cong Ewt/l$, where E is the Young's modulous of the material forming the beam, and w, t and l are the respective width, thickness and length of the beam. In contrast, a vibration characterized by periodic motion perpendicular to the length of the beam, the spring constant k is generally proportional to the cube of the dimension along which vibration occurs, multiplied by the other dimension perpendicular to the length, and divided by the cube of the length. Thus for lateral vibration of such a beam parallel to a disk surface, $k_{lat} \approx w^3 tE/4l^3$, where w is the beam dimension along which vibration occurs and t is the thickness of the beam normal to the disk surface. Note that for a beam having a length l much greater than a width w, $k_{lat}$ approaches zero, and thus the resonant frequency $f_R$ for lateral vibrations is very low. Since a cubic dependence on the length-to-width ratio does not occur for longitudinal vibrations, longitudinally directed forces have much less tendency to result in large displacements of the free end of the beam.

Figure 2:
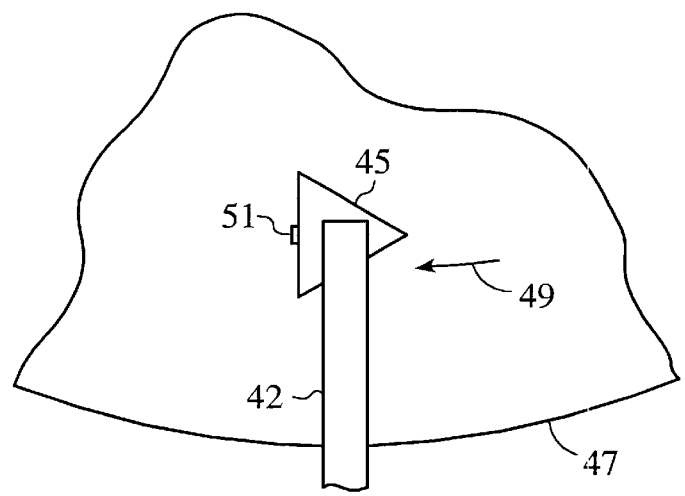
FIG. 2 is a top view of a prior art contact drive system having a beam oriented perpendicular to the direction of disk travel.

FIG. 2 shows a prior art beam 42 employed to hold a slider 45 in contact with a rigid disk 47 spinning in a direction 49, the slider having an appended magnetic transducer 51 for reading and writing on the disk 47. The large triangular slider 45 has an apex pointing into the thin film of air that travels with the disk 47 surface and that otherwise would be expected to lift the slider from the surface and terminate generation of the triboelectric attractive force that is said to hold the slider to the disk. The beam 42 is radially oriented above the disk 47 and held by an actuator, not shown, that allows the slider 45 to move radially to access different concentric data tracks of the disk. The triboelectric force said to be generated by rubbing between the slider 45 and the disk 47 would be expected to excite lateral vibrations that would interfere with data writing and reading, unless a very large, stiff beam is employed, at the risk of damaging the disk.

Figure 3:
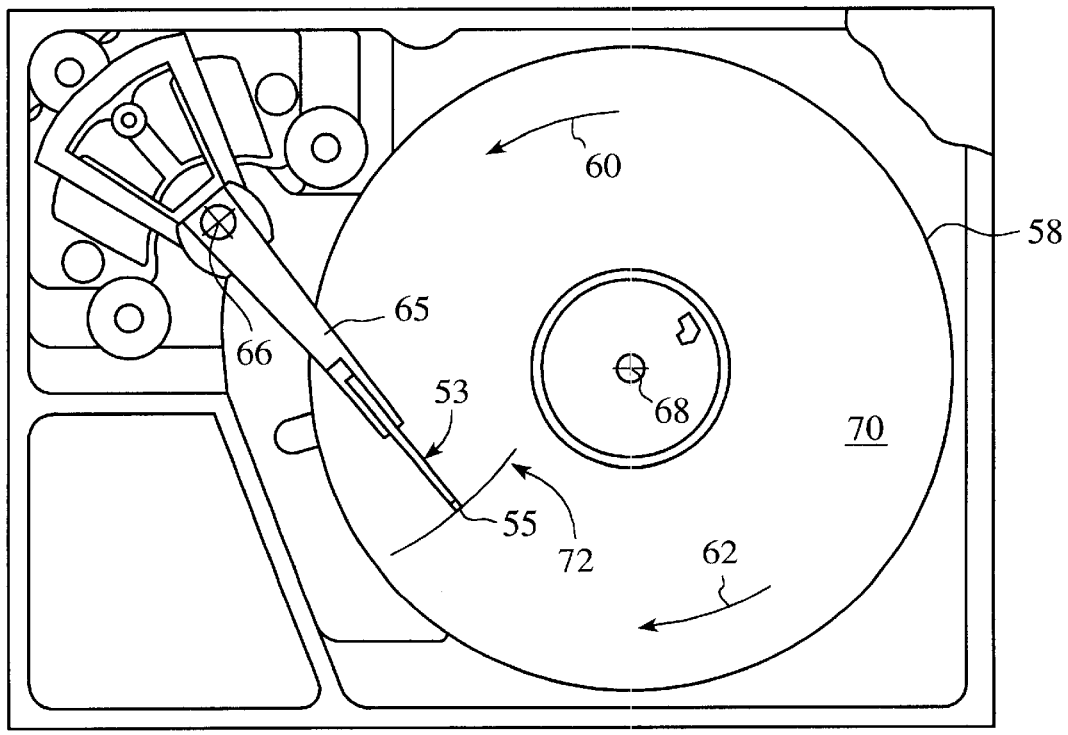
FIG. 3 is an opened up top view of a disk drive system employing the flexure beam and transducer of FIG. 1.

FIG. 3 shows a flexible beam 53 of the present invention operating to hold a microscopic transducer 55 in contact with a rapidly spinning, rigid magnetic storage disk 58. The disk 58 typically operates at between 3,000 and 6,000 revolutions per minute (RPM) in either a forward mode, as indicated by arrow 60, or a reverse mode that is indicated by arrow 62, although slower or faster angular velocities are practicable. It is important for both the forward and the reverse mode of operation to minimize the moment arm about the projection or projections of the transducer 55 contacting the disk 58, and so the height at which the beam is mounted to an actuator arm 65 is preferably limited to about 20 mils or less. 1he actuator arm 65 pivots about an axis 66 which is essentially parallel to an axis 68 about which the disk 58 rotates, so that transducer 55 can access various concentric data tracks of the magnetic recording surface 70 of the disk 58 by sweeping over an arcuate path 72. The angle between local disk 58 motion at the point of contact with the transducer 55 and the longitudinal axis of the flexure beam reaches a maximum of about 20° near an inner or outer radius of the surface 70. Surprisingly, the transducer 55 has been able to tolerate skew angles of up to 20% without excessive vibration, perhaps due to the small size of contact area between the disk and head and the low load of the head. The small load force of the beam and the extremely small contact area of the transducer, as well as other friction reducing interface characteristics, combine to allow the beam to tolerate these maximum skew angles without excessive vibration.

In contrast to well known laws of friction, such as Amonton's Law, friction has been measurably reduced in the present invention due to a reduction of pad-disk contact area, despite holding vertical load constant. Even such a small pad, however, can excite vibrations if a mode of vibration is coupled to a changing force. For example, a torsional mode of vibration of a beam can result in tilting a flat contact area of a pad first on one edge and then another, with a fully contacting position occurring between each tilting position. The frictional force on the pad can be many times greater when the pad is fully contacting than when the pad is on an edge, which can drive a greater torsional vibration, or a lateral frequency harmonic with the torsional frequency. Dynamic instabilities such as vibration would be much more problematic with a larger conventional slider, which would tend to have larger and less stable friction during sliding on the disk. In particular, a gimbal that allows greater torsional freedom in combination with a prior art slider having a much larger full contact area would tend to vibrate much more easily, even in the absence of other instabilities.

FIG. 4 shows another embodiment of the present invention including a slider 80 that has been designed, in part, to reduce vibrations by minimizing and stabilizing friction with the disk, not shown in this figure. For stability, the slider has three small wear pads 82, 84 and 86 that slide on the disk. The three-pad design allows the slider to remain in full contact with the disk despite disk surface anomalies, waviness or differences in pad height. In order to minimize friction, each of the pads has a minimized contact area consistent with long term wear of the pads. Pads 82 and 84 encounter the disk downstream of pad 86, so that the resultant frictional force felt by the slider is directed away from any effective pivot axis about which the slider can rotate. Moreover, for a temporary situation in which the forward pad 86 contacts the disk while one of the back pads 82 and 84 does not, the resultant friction force still is not directed toward an effective pivot axis, due to the axial location of the forward pad and the larger friction of either of the back pads than the forward pad. Pads 82 and 84 each contain a pair of poletips separated by an amagnetic gap, not shown in this figure, although only one of magnetically active pads (MAPs) 82 and 84 is electrically connected to the drive electronics for reading and writing on the disk. This functional magnetically active pad (FMAP) is chosen based upon superior relative test results, and then mounted to a suspension such that the FMAP is positioned closer to the outside of the disk surface, in order to access a greater surface area of the disk. For stability, pads 82, 84 and 86 are spaced as far apart as possible consistent with other constraints such as minimization of slider size for reduced mass and increased yield per wafer. In the example shown in FIG. 4, the distance between the MAPs 82 and 84 is preferably between 10 mils and 40 mils, while the distance between MIP 86 and either of the MAPs is generally in a range between about 20 mils to 80 mils.

The three pads 82, 84 and 86 extend about 3 $\mu$m to 10 $\mu$m from a mostly flat disk-facing surface 88 of the slider 80, a distance which is sufficient to remove that surface from most of the thin air layer accompanying the disk and to maintain an aerodynamic lift force felt by the slider below about 100 milligrams. Optionally, as shown in FIG. 4, slider 80 may have a recessed area 89 that further reduces aerodynamic lift and, depending upon the shape of recessed area 89, may produce a negative pressure region that counteracts the lifting force on pads 82, 84 and 86 and surface 88. Surface 88 areas around MAPs 82 and 84 overlie planar transducers including adjacent bottom yokes, so that those surface areas cannot be recessed much without affecting transducer performance, however, all other areas of surface 88 that do not directly support pads 82, 84 or 86 may optionally be removed. The recessed area 89 is generally spaced a few microns (2 μm to 10 μm) further from the disk than surface 88.

FIG. 5 shows a surface 90 of the slider 80 that faces away from a disk for mechanical and electrical interconnection to a suspension and actuator of a drive. A trio of conductive posts 92, 94 and 96 project from the surface 90, providing mechanical stability and tolerance for height variations in a fashion similar to that of the three oppositely extending pads 82, 84 and 86, although the posts are thicker, higher and closer together than the pads. The posts also provide electrical connections for the MAPs, with post 92 being connected to the transducer associated with MAP 82, post 94 being connected to the transducer associated with MAP 84, and post 96 being a common connection for both transducers. Selection of the FMAP is made by electrical connections between the posts provided by the attached suspension, as will be seen, for example by providing a drive circuit between the common post 96 and the post 92 or 94 associated with the FMAP, while shorting the common post 96 to the post not associated with the FMAP. Posts 92, 94 and 96 are typically made of gold, which offers reduced resistance and an advantageous surface for bonding, and are spaced a few hundred microns apart (preferably 100 μm to 400 μm). The posts 92, 94 and 96 are each about 30 μm to 100 μm in height, and about 100 μm to 200 μm in diameter. For a slider embodiment employing a magnetoresistive (MR) read element, an additional conductive post, not shown in this figure, may be provided for the active MR element, while the electrical circuits in the chip not associated with the FMAP may be severed, for instance with a laser.

A cross-section of the transducer associated with MAP 82 is shown in FIG. 6, with the understanding that a similar transducer is associated with MAP 84 but is not shown for brevity. MAP 82 is composed of a pair of poletips 98 and 99 which are separated by an amagnetic gap 100 and encompassed by a hard, durable wear material 102 such as amorphous, diamond-like carbon (DLC). A high magnetic saturation ($B_s$) material 101 may be formed on the trailing poletip 99 adjoining the gap 100 for increased writing efficiency. The poletips 98 and 99 protrude from a generally planar (low profile), loop-shaped, magnetically permeable core 104 that extends longitudinally within slider 80 and symmetrically above those poletips. A coil 106 spirals in at least one layer to wind around the core, in order to provide a current for inducing a magnetic flux in the core and writing data to a disk. The coil is connected with posts 92 and 96 for this purpose. A thin MR ribbon 108 may be disposed adjacent to a portion of the core far from the MAP 82, in order to read data induced flux in the core by measuring changing resistance in the MR element. Locating the MR stripe far from the poletips removes the MR element from temperature induced fluctuations that occur closer to the disk, while affording high resolution reading through the disk-contacting poletips, as transmitted by the magnetically permeable core. Additionally, since both writing and reading is performed through the same poletips 98 and 99, tracking and bit shift problems are avoided. Instead of employing an MR sensor, the coil 106 may be employed in reading data inductively.

An inductive sensing embodiment of the transducer associated with MAP 82 shown in FIG. 7 employs additional coil turns 109 to increase the inductive sensitivity, and of course the MR stripe is absent to decrease the reluctance of the core, as disclosed in U.S. Pat. App. Ser. No. 08/528,890, which is hereby incorporated by reference. Other elements of this transducer are similar to those shown in FIG. 6 and so will not be reiterated.

Figure 8:
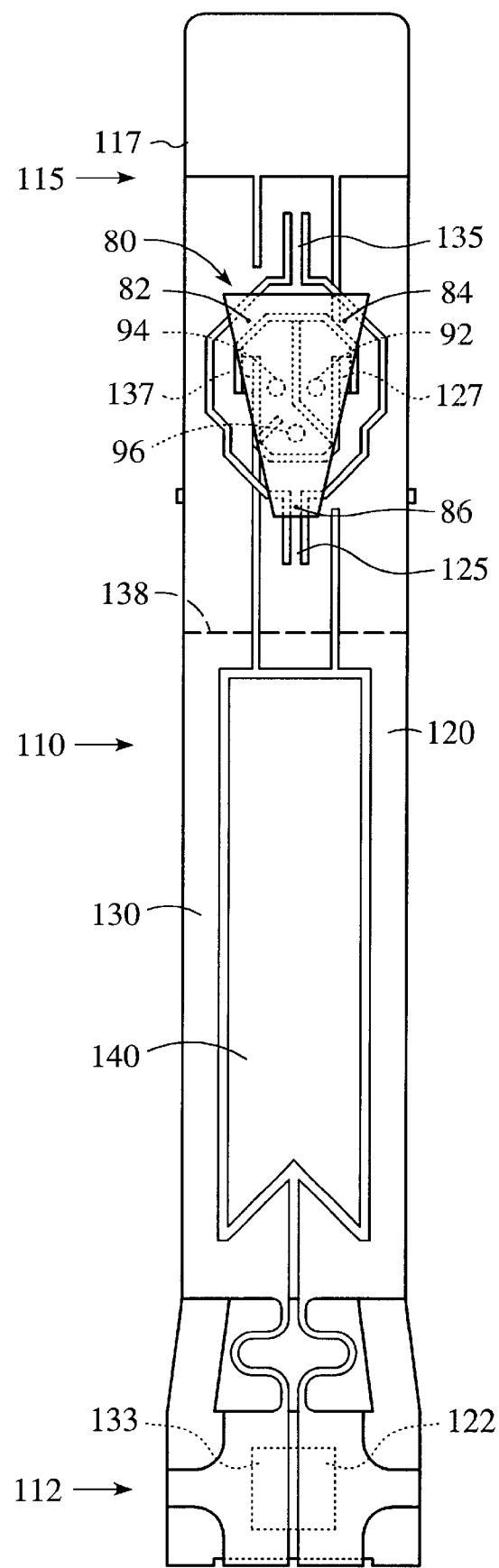
FIG. 8 is a bottom view of a disk-facing side of an elongated, gimbaled flexure beam employed for holding and electrically communicating with the slider of FIGS. 4 and 5.

The posts 92, 94 and 96 of the inductive sensing embodiment are connected to a generally flat, elongated flexure beam 110 shown in FIG. 8, in which a dashed outline of the trapezoidal slider 80 is shown attached beneath the beam. Connection of the posts 92, 94 and 96 and beam 110 is typically accomplished by soldering, thermo-compressive or ultrasonic bonding, or similar means. The flexure beam 110 is designed to optimize somewhat conflicting constraints for minimizing head and disk damage, vibration of the slider, and track access time. The beam 110 has a mounting end 112 and a free end 115, with the slider 80 disposed adjacent to the free end. Since two MAPs 82 and 84 are located closer to the free end while only a single MIP 86 is disposed closer to the mounting end, the media contacting the pads, not shown in this figure, travels generally from the mounting end to the free end. A tab 117 of the beam 110 extends beyond the slider at the free end 115, the tab providing protection for the slider 80 and an extension for handling the beam and slider. During a shock which ejects the slider 80 from the disk, the overlap between the slider and the beam 110 prevents the flexible gimbal interconnects between the slider and the beam from overextension and resultant damage. The beam is formed of a series of layers including a conductive layer which is patterned to provide a plurality of leads to the slider 80, a stiffening layer located far from the slider and a damping layer disposed between the conductive layer and the stiffening layer, the damping layer also providing structural support and electrical insulation between the conductive and stiffening layers for the case in which the stiffening layer is electrically conductive.

A first conductive lead 120 extends generally along a side of the flexure 110 in FIG. 8 between the slider 80 and a terminal 122 for lead wire interconnection. The lead 120 connects to one of the conductive posts 92 of the slider 80 via a first longitudinal torsion bar 125 and a first lateral torsion bar 127. A second lead 130 extends along another side of the flexure 110 between a second terminal 133 and a tip of the conductive disk-facing layer of the flexure, to connect with posts 94 and 96 of the slider 80 via second longitudinal torsion bar 135 and second lateral torsion bar 137. The first and second longitudinal bars 125 and 135 offer relative freedom to the slider 80 to rotate about a longitudinal axis connecting the bars 125 and 135, while lateral bars 127 and 137 allow relative freedom to the slider for rotation about a lateral axis connecting the bars 127 and 137. Since posts 94 and 96 are shorted by lead 130, signals are transmitted to and from posts 92 and 96, causing the FMAP to be pad 84 rather than pad 82. For the situation in which pad 82 rather than pad 84 is desired to be the FMAP, a flexure having a mirror image of conductive leads 120 and 130 is connected to chip 80, so that posts 92 and 96 are shorted together and signals are instead transmitted via posts 94 and 96. The width of leads 120 and 130 have been reduced by cutting out an island 140 in the conductive layer, in order to reduce capacitance between those leads and the stiffening layer, which in this example is made of stainless steel. For an embodiment in which the stiffening layer is made of nonconductive material, e.g., alumina, such interlayer capacitance is not present. A slight bend 138 of about 2° is formed in the beam 110 to make the section of the beam holding the transducer more parallel with the disk surface.

Thus the slider 80 has freedom to rotate about lateral and longitudinal axes parallel to the disk surface, allowing the slider to quickly and painlessly conform to variations in the disk surface. At the same time, edges of the slider extend laterally and longitudinally beyond the gimbaled freedom afforded by bars 125, 135, 127 and 137, so that excessive slider motion is stopped by the beam 110, which also absorbs energy from the slider during such contact, reducing the impact of a shock to the drive. It has been found that damage from such a shock typically does not occur initially when the transducer is in contact with the disk, but rather occurs during recontact between the transducer and the disk, after the transducer has been jarred from the disk by the shock. The shock absorbing limit provided by the overlapping beam thus allows the transducer to react to variations in the disk surface or shocks to the drive without damage to the transducer-disk interface.

The disk on which the slider 80 writes and reads moves substantially from the mounting end 112 to the free end 115 of the flexure 110, so the resultant force of friction on the slider, which is defined as that hypothetical single force applied to a single location of the slider which is equivalent to the combined frictional forces felt by the pads 82. 84 and 86, is directed toward the free end and is located closer to the free end than the bars 127 and 137, due to the overweighting of friction from pads 82 and 84 compared to pad 86. This avoids a potentially unstable situation in which the resultant frictional force would cause a rotation of the slider about the pivot axis of bars 127 and 137, which would further increase the resultant frictional force. Another means for avoiding such an unstable situation is to reduce the loading on the leading pad or pads, since the friction of each pad generally depends upon the load applide to that pad. In an extreme case detailed below the load can be so reduced compared to an aerodynamic lifting force that the leading pads are removed from the disk while the trailing pad drags.

Figure 9:
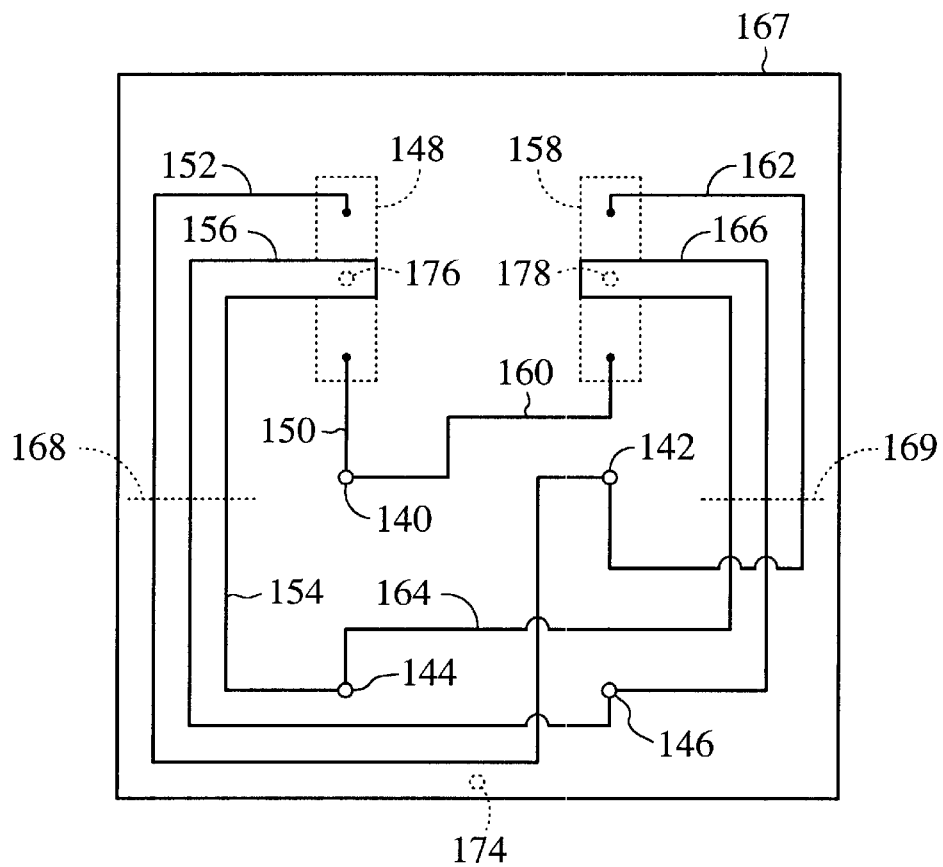
FIG. 9 is a top view diagram of slider electrical leads for a pair of inductive writing and magnetoresistive sensing transducers of FIG. 6.

Instead of choosing the FMAP based upon connecting the slider posts 92, 94 and 96 to one of two mirror image integrated gimbal conductors, the FMAP of an MR sensing embodiment may be selected by severing redundant conduction leads on the non-disk-facing side of the chip 80, as shown in FIG. 9. A pair of conductive posts 140 and 142 provide connections between the write coils of the chip and the write electronics of the drive, while another pair of conductive posts 144 and 146 provide connections between the MR sensing circuits of the chip and drive. A first transducer 148 has leads 150 and 152 which connect opposite terminals of its coil with write posts 140 and 142, respectively. Leads 154 and 156 connect posts 144 and 146, respectively, with the MR sensing element of transducer 148. In this transducer 148, the MR sensing element crosses the yoke twice, increasing the series resistance and causing leads 154 and 156 to extend from the same side of that transducer. A second transducer 158 has leads 160 and 162 which connect opposite terminals of its coil with write posts 140 and 142, respectively, and leads 164 and 166 that connect posts 144 and 146, respectively, with the MR sensing element of transducer 158. After wafer level testing of this chip 167 to determine whether transducer 148 or 158 offers superior performance, that transducer is selected by severing the leads to the other transducer, and the chip is mounted on an up or down side of the disk so that the FMAP is closer to the outside edge of the disk surface. For employment of transducer 158 as the FMAP, leads 152, 154, 156 and optionally 150 may be severed along line 168, for example, by laser ablation. Similarly, line 169 may be cut to select transducer 148 as the FMAP. Note that the leads are arranged so that most or all of the leads connected to a given transducer may be severed by ablation or etching of a small portion far from either transducer. A MIP 174 is spaced on an opposite side of the posts 140, 142, 144 and 146 from MAPs 176 and 178, so that connecting the posts to a gimbal affords the chip 167 limited movement for contacting the disk with the MIP and MAPs.

Figure 10:
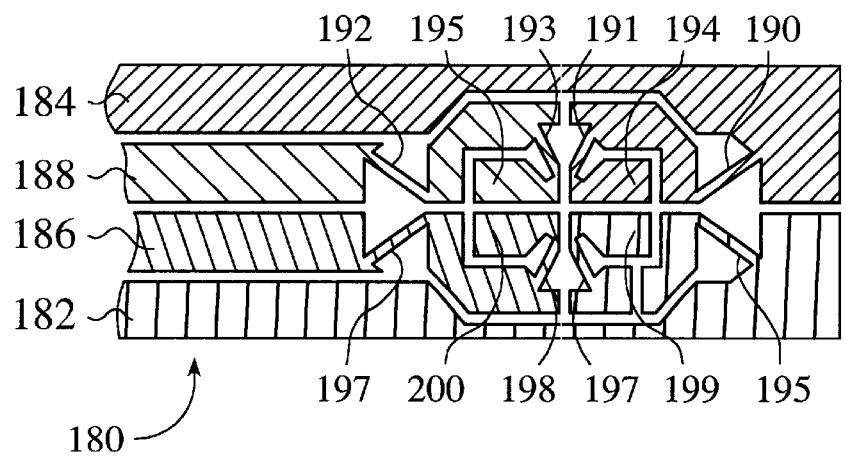
FIG. 10 is a bottom view of a disk-facing side of an elongated, gimbaled flexure beam employed for holding and electrically communicating with the slider of FIG. 9.

FIG. 10 shows a conductive layer of a laminated flexure suspension 180 having a pair of write leads 182 and 184 as well as a pair of sense leads 186 and 188. The suspension 180 is formed of two stainless steel layers, one of which includes the leads 182, 184, 186 and 188, the steel layers sandwiched about a damping, insulative adhesive layer. Copper or other conductive materials may alternatively be used for the leads, and the suspension may alternately be formed by deposition and micromachining. Write lead 184 extends across a first strip 190 and then across a second strip 191 to connect with terminal 194, for bonding with post 140, not shown in this figure. Similarly, write lead 182 extends across a third strip 195 and a fourth strip 197 to connect with terminal 199, which is positioned for attachment with post 142. Sense lead 188 is connected by fifth and sixth strips 192 and 193 to terminal 195, which will be bonded with post 144, while sense lead 186 extends via seventh and eighth strips 197 and 198 to terminal 200, for bonding with post 146. The strips are constructed to allow gimbal rotation along an axis parallel to the disk surface, while maintaining lateral and longitudinal stiffness important for minimizing track access and bit shift errors. For example, leads 186 and 188 and strips 192 and 197 form a triangular frame that is much more rotationally flexible than laterally or longitudinally flexible, and similar triangular frames are apparent in the remainder of the strips. In order to limit slider 166 motion and remove kinetic energy from the slider in the event of a shock to a drive, leads 182, 184, 186 and 188 are positioned to create a backstop to the outside of the slider.

FIG. 11A shows a slider 202 having a single MAP 203 protruding from a mostly flat disk-facing surface 204 near a leading edge 205, with a pair of MIPs 207 and 208 protruding from that surface near a trailing edge 209. For operation with a forward spinning disk, the trailing edge 209 is disposed further than the leading edge 205 from the mounting end of the beam, while reverse spinning of the disk calls for the leading edge to be located further from the actuator than the trailing edge. The single MAP 203 is axially located near the position shown for MIP 86 of FIG. 4, albeit further from the chip edge to allow for the MAP's associated transducer, while the pair of MIPs 207 and 208 are located near the positions of MAPs 82 and 84 of FIG. 4 but closer to their respective corners of the chip.

FIG. 11B shows a slider 210 having a single MAP 212 near a trailing edge 215 and a pair of MIPs 217 and 220 near a leading edge 222. This slider has a pair of air bearing plateaus 225 and 226 connected near the leading edge 222 and designed to cause that edge to levitate slightly during operation while the trailing edge 215 does not, causing MAP 212 to be at least occasionally the sole point of contact with the disk. The surface, which was covered with DLC and etched to create the MAP and MIPs, is selectively etched again to form a negative pressure recess 227 surrounding MAP 212 and an arcuate positive pressure ramp 230 near the leading edge 222. A subsequent etch step may optionally create an additional recess 233 ahead of the ramp 230, in order to provide additional lilt near the leading edge. The MIPs 217 and 220 are of a reduced thickness in this embodiment, to compensate for reduced sliding on the disk relative to the MAP 212, and thus coordinate the wear rates. A portion 235 of the surface adjoining the MAP 212 is protected from etching to avoid damage to the transducer associated with the MAP. MIPs 217 and 220 may also have a slightly enlarged base that was protected from etching. The sliders 202 and 210 may be attached to the beams 110 or 180 depending upon whether inductive or MR sensing transducers are employed.

Figure 12:
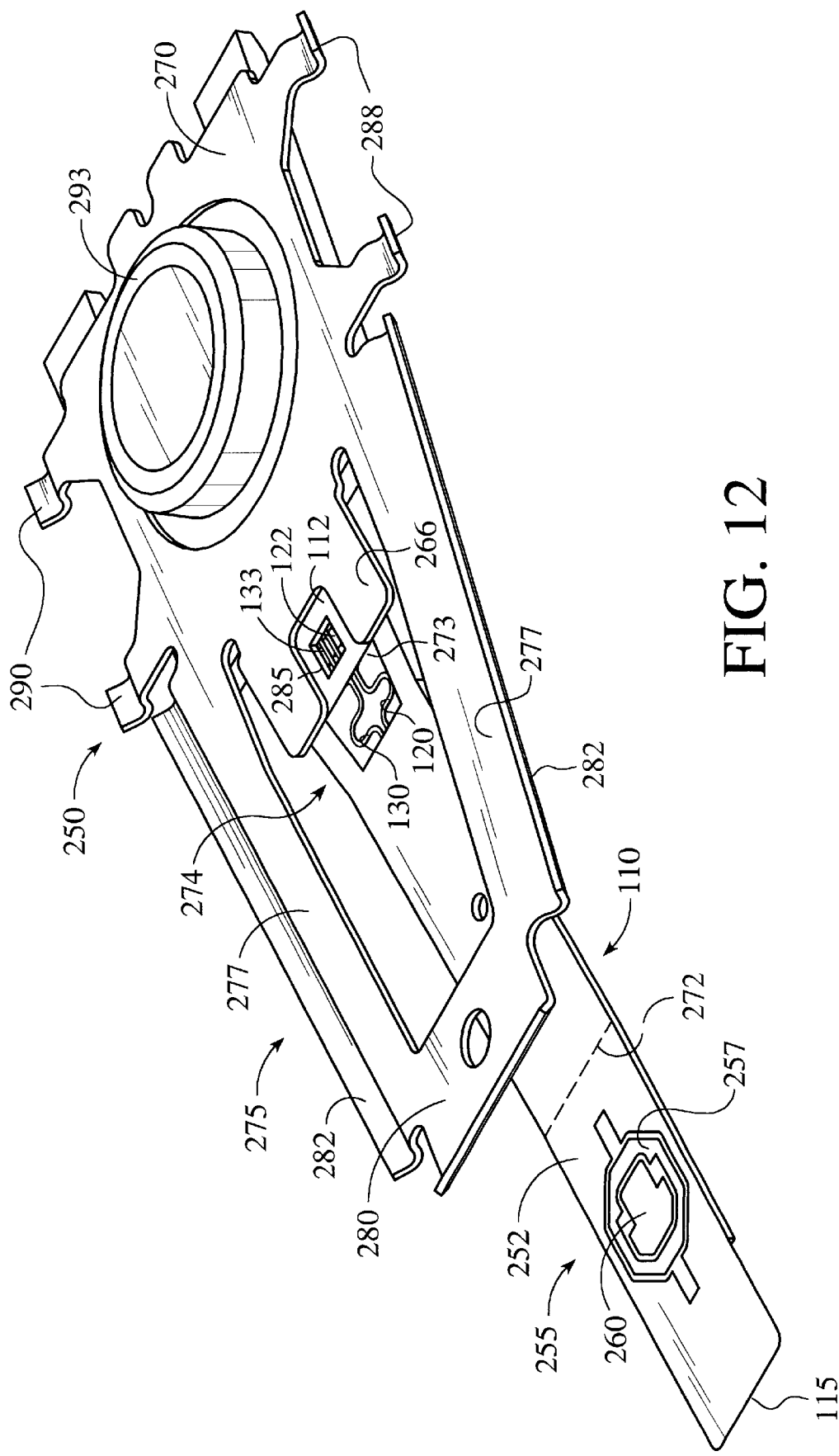
FIG. 12 is a perspective view of an adapter of the present invention holding the flexure beam of FIG. 8 for mounting to a conventional rotary actuator.

In FIG. 12 an adapter 250 allows the beam 110 of the inductive sensing embodiment to be fitted to a conventional actuator arm without bending the beam, offering improvements in load adjustment and handling. Moreover, the adapter 250 overhangs the beam 110, providing a shock absorbing backstop similar in effect to that of the beam 110 overlap of the slider 80. A top stiffening layer 252 of the beam 110 is seen in this figure to be essentially contiguous, as this layer 252 is primarily structural in function, and may be formed, for instance of stainless steel having a thickness of about 1 mil. A cut-out gimbal area 255 is seen from this perspective to include an annular section 257 that is separated from the remainder of the stiffening layer 252, and a central area 260 that is separated from and disposed within the annular section 257. The elongated, flat shape of the flexure beam 110 promotes longitudinal and lateral stiffness while motion in a direction toward and away from the disk is accommodated by the hinge. The gimbal area 255 allows the slider to pitch and roll a limited amount with greatly reduced constraint, beyond which edges of the slider are stopped by the flexure beam 110 surrounding the cut-out gimbal area. The free end 115 of the beam 110 extends substantially beyond the location where the slider attaches to the beam, providing protection and ease of handling to the head gimbal assembly (HGA). In operation, the extension of the free end 115 well beyond the slider provides a tab for loading and unloading the HGA on the disk. Specifically, if the actuator arm is pivoted to position the slider at an extreme outer diameter of the disk, the free end 115 extends beyond the disk for lifting access.

The mounting end 112 of the beam 110 is attached to a pre-bent flange 266 of the adapter 250, causing the beam to project at a predetermined angle to the disk surface, thereby determining the static load of the transducer on the disk. Attachment of the beam 110 to the adapter 250 is typically achieved by spot welding, adhesive epoxy or other conventional means. The attachment of the beam 110 to the bottom rather than the top of the mounting surface keeps the flange 266 from shorting the conductive leads 120 and 130 of the beam and provides a clean surface of the flange for adhesion. In contrast to conventional means for angling a beam toward a disk, which involve bending the beam and thereby creating a host of stresses within the beam that may be released in unpredictable manners including attempting stress removal by heat treatment, forming a bend in the stiff flange 266 does not result in measurable variations in the spring force of the beam. The flange is typically angled at about 5° to 10° to the plane of a baseplate 270 of the adapter 250, which is essentially parallel to the disk surface. An optional approximately 2° bend 272 may be provided to the beam 110 in order to increase the parallelism between the portion of the beam adjacent to the slider and the disk surface, not shown in this figure. Alternatively, the adapter flange can provide both an angle that approaches the disk surface and a converse angle that brings the beam more close to parallel with the disk surface, allowing for a lower profile beam attack angle.

An opening 273 in the stiffener, damping and conducting layers allows the beam 110 to bend more freely, essentially creating a hinge 274 at the opening area. The conductive leads 120 and 130 are also patterned within the opening 273, enhancing flexibility of the beam 10 at the hinge 274. The combination of the angled adapter flange 266 for mounting the beam and the adjacent hinge 274 present a fundamentally different geometry and force profile than conventional beams that are mounted parallel to the disk surface and bent. The static load provided by the angled flange 266 and hinge 274 is set much lower, preferably in a range between about 50 and 200 milligrams, as compared to loads of conventional beams in excess of 1 gram and often several grams. The low load of the present invention is allowed by the low aerodynamic lift of the slider. which is designed to minimize the portion of the slider substantially affected by the layer of air accompanying the disk. Such sliders have maintained aerodynamic lift below 150 mg for linear velocities of up to 18 m/s, with further improvement in sight. Providing the hinge 274 far from the transducer reduces the angular constant of the beam 110, which is helpful in meeting tolerance requirements.

A U-shaped bar 275 of the adapter 250 overhangs the mounted beam 110 to provide protection, handling capabilities and shock absorption for the beam. The bar 275 has a pair of longitudinal rails 277 that are spaced further apart than the width of the beam 110, with a lateral cross bar 280 connecting distal ends of the rails. The rails 277 have rolled sides 282 for increased longitudinal stiffness and may extend back into the baseplate 270 in order to further increase that stiffness. The beam 110 is shown in FIG. 12 as it appears hanging from the adapter 250 and without a disk below, as is the case during assembly. At this stage the adapter 250 provides a means for handling the beam 110 without damage, as the beam and adapter can be grasped, with a tweezers for instance, during which process the beam is nestled between the rolled extensions and held near the cross-bar 280. During operation, when the contact with the disk has arched the flexure beam 110 upward closer to the cross-bar 280, the cross-bar serves to limit the movement of the beam away from the disk in response to shocks, absorbing energy from the beam in order to reduce the impact as the beam and slider slap back down against the disk. A beam-facing side of the cross-bar 280 may optionally be coated with a damping material in order to aid in the one-way energy transfer from the beam to the adapter 250.

An opening 285 in the stiffener and damping layers of the beam exposes the terminals 122 and 133 of the respective conductive leads 120 and 130 attachment to wire leads, not shown in this figure, which are braided and then crimped into or bonded onto wire captures 288 on the near side. Another set of wire leads 290 are disposed on the far side of the adapter 250, which may be used for an adapter on an opposite side of the disk. for instance. A cylindrical boss 293 allows the adapter 250 to be swage mounted to an actuator arm. That is, the boss 293 fits within a cylinder at the end of the actuator arm, and the two are fixed together by driving a steel ball through the mated cylinders, riveting the actuator arm and adapter 250 together, a process known as swaging.

Referring now to FIG. 13, the adapter 250 also serves to balance the mass of a conventional actuator arm 300 about a pivot axis 302, as the actuator 305 has been designed for larger conventional sliders and beams. The actuator 305 allows the slider 80 to sweep across a rigid disk 310 between an outer diameter 312 and an inner diameter 314 along an arcuate path shown by double arrow 316. During reading and writing of information on the disk 310, the slider 80 maintains essentially continuous contact with either the disk surface 318 or a microscopically thin lubricant layer distributed on the disk surface, while the disk spins rapidly in either a forward direction, as indicated with arrow 320, or a reverse direction, as indicated by arrow 322. Reversal of the chip mounting direction may be important to ensure that, in the reverse spinning mode, the resultant frictional force is adjacent to the trailing edge of the slider, as well as directed away from the pivot axes about which the friction can force slider movement. The remainder of the drive system mechanism shown in FIG. 13 is fairly conventional and so will not be described in great detail. One should note, however, that a similar actuator arm, adapter, beam and slider is disposed on an opposite surface of disk 310 from surface 318, that actuator arm generally sharing the pivot axis 302 of actuator 305. That slider may have an FMAP disposed, like that of slider 80, to provide maximal disk surface 318 access. A stack of such disks and pairs of sliders may be included in a drive.

What is claimed is:

1. A device for reading or writing information on a spinning, rigid magnetic storage disk, comprising:

an elongate flexure beam extending between a mounting end and a free end and including a plurality of longitudinal conductors, and an electromagnetic transducer composed of a plurality of adjoining layers, connected to said beam adjacent to said free end and coupled to said conductors, said transducer concurrently communicating with and contacting a portion of the disk traveling from adjacent said mounting end substantially along a lengthwise direction of said beam, wherein said transducer has at least one projection contacting the disk and containing a magnetic pole structure, said at least one projection having a disk-facing area smaller than 10,000 $\mu m^2$.

2. A device for reading or writing information on a spinning, rigid magnetic storage disk, comprising:

an elongate flexure beam extending between a mounting end and a free end and including a plurality of longitudinal conductors, and an electromagnetic transducer composed of a plurality of adjoining layers, connected to said beam adjacent to said free end and coupled to said conductors, said transducer concurrently communicating with and contacting a portion of the disk traveling from adjacent said mounting end substantially along a lengthwise direction of said beam, wherein said transducer has a plurality of projections extending toward the disk, at least one of said projections having a magnetic pole structure exposed on a disk-facing side.

3. The device of claim 2 wherein said projections include a single leading pad and a pair of trailing pads.

4. A device for information storage or retrieval comprising:

a rigid disk spinning about an axis and having a surface with an associated magnetic storage medium, a thin-film transducer in dynamic contact with a local portion of said surface during communication with said medium, and an elongated flexible beam having an end coupled to said transducer and cantilevered toward said end adjacent to said surface substantially along a direction of travel of said portion, wherein said transducer has three disk-contacting protrusions.

5. The device of claim 4 wherein a first of said protrusions generally encounters said portion ahead of the other two protrusions.

6. A device for information storage comprising:

a rigid disk having a surface with an adjacent magnetic storage medium, and an elongated flexure extending between a free end and a mounting end and holding a deposited transducer adjacent to said free end, said transducer sliding on said surface in a direction substantially aligned with a length of said flexure during communication between said transducer and said medium, said transducer having a magnetic pole structure with a poletip disposed adjacent to said surface, wherein an aerodynamic lift force on said transducer is less than 150 mg for adjacent disk linear velocities greater than 3 m/s and less than 18 m/s.

* * * * *